March 24, 1959     E. D. GREEN ET AL     2,879,503

AUTOMATIC ACQUISITION SYSTEM FOR RADAR

Filed July 25, 1955

WITNESSES

INVENTORS
Elberson D. Green &
Harry B. Smith.
BY
ATTORNEY

United States Patent Office 2,879,503
Patented Mar. 24, 1959

2,879,503

AUTOMATIC ACQUISITION SYSTEM FOR RADAR

Elberson D. Green, Baltimore, and Harry B. Smith, Catonsville, Md., assignors to Westinghouse Electric Corporation, East Pittsburgh, Pa., a corporation of Pennsylvania Application July 25, 1955, Serial No. 524,016

7 Claims. (Cl. 343—7.3)

This invention relates to radar systems and, more particularly, to an automatic acquisition device for a radar range tracking system.

In a radar automatic range tracking system, apparatus is provided which is adapted to produce an output voltage proportional at any instant to the range (i.e. distance) of an object being tracked with the radar system. A description of various types of range tracking techniques and systems may be found, for example, in "Electronic Time Measurements," volume 20, MIT Radiation Laboratory Series, by R. I. Hulsizer and F. C. Williams, McGraw-Hill Book Company, Incorporated, New York, 1949. In general, an automatic range tracking system consists of the basic elements of a time modulator and a time demodulator. The time modulator will vary the phase position of an output voltage pulse with respect to a transmitted energy pulse from the radar system as a function of a direct current error signal. The time demodulator, on the other hand, will produce a direct current output voltage which is a function of the difference in phase between the output voltage pulses from the time modulator and the target returns or reflected energy pulses received by the radar system. By applying at least a portion of the direct current output from the time demodulator to the time modulator as an error signal, a servo system is established which will produce an output voltage from the aforesaid time demodulator which is proportional in magnitude to the range of the target being tracked.

When a distant target is first detected by the radar system, the output of the time demodulator will be zero. Consequently, there will be an absence of a direct current error voltage to initiate the action of the time modulator in positioning voltage pulses with respect to the transmitted energy pulses from the radar system. Before the range tracking system will take control and become, in effect, "automatic," some means must be provided to initially supply a direct current voltage to the time modulator to position its output voltage pulses so that they coincide in time with the video return signals from the aforesaid distant object which is being tracked. For this purpose, an automatic acquisition circuit is provided which supplies an initial direct current voltage to the time modulator. The output voltage from this acquisition circuit is a substantially linearly decreasing voltage which recycles in its descent after a predetermined period of time. Thus, the automatic acquisition circuit, in one sense, may be called a saw-tooth wave generator.

It is an object of our invention to provide a new and improved automatic acquisition circuit of the type described above for use in a radar automatic range tracking system. In prior art devices of which we are aware, automatic acquisition has usually been accomplished by charging a range memory capacitor which has one terminal grounded. The difficulty with this method is that the range memory capacitor is large (i.e. .25 μfd.), and the voltage on the capacitor must be changed at the rate of one volt per microsecond. The required current thus becomes very large, in the present example 250 milliamperes. In designing an automatic acquisition circuit having a grounded range memory capacitor, it is necessary to use a tube which will handle 250 milliamperes; or, as an alternative, two capacitor charging stages may be used in the charging process. In the latter method, the voltage on a small capacitor requiring small charging current is first changed, and then the voltage on a larger capacitor is changed at a leisurely rate. Both of these methods, while workable, are critical and have certain disadvantages which are avoided in the present invention.

It is another more general object of our invention to provide a new and improved saw-tooth wave producing circuit.

The above and other objects and features of our invention will become apparent from the following detailed description taken in connection with the accompanying drawings which form a part of this specification, and in which.

Figure 1:
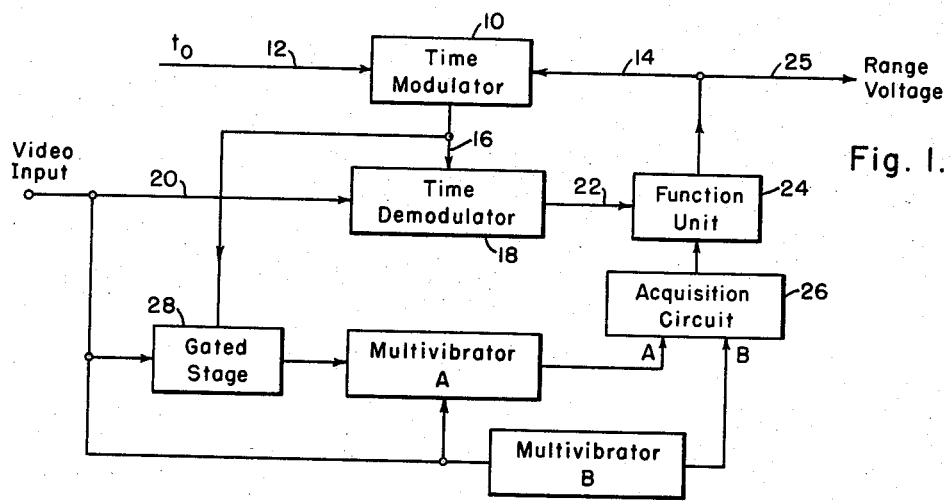
Fig. 1 is a block diagram of a radar automatic range tracking circuit incorporating our invention.

Referring to Fig. 1, the range tracking circuit shown includes a time modulator 10 adapted to produce a train of output voltage pulses which are positioned in phase with respect to the transmitted energy pulses from the radar system as a function of an error signal. As shown, the transmitted energy pulses (indicated by their repetition time interval $T_0$) are fed to modulator 10 via a path 12; the error signal is fed to the modulator via path 14; and the output voltage pulses are taken from the modulator and fed via path 16 to a time demodulator 18. A full and detailed description of various types of time modulators may be found in "Wave Forms," volume 19, MIT Radiation Laboratory Series by D. Sayre, McGraw-Hill Book Company, Incorporated, New York, 1949.

The time demodulator 18 compares the phase of the output voltage pulses from time modulator 10 with the phase of the video return signals received by the radar system to produce a direct current output voltage which is proportional to the difference in phase between these two signals. Video return signals are fed to the time demodulator via path 20, and the output direct current signal of the demodulator is taken via path 22. A full and detailed description of one type of time demodulator which may be used with the present invention may be found in our copending U.S. application Serial No. 465,168, filed October 28, 1954, and assigned to the assignee of the present application. Other types of time demodulators may be found in the aforesaid volume 19, MIT Radiation Laboratory Series.

The output of time demodulator 18 passes through a function unit 24, hereinafter described, and is taken from output lead 25 as a voltage proportional to the range of a target being tracked. Part of the output of the time demodulator is fed through path 14 to time modulator 10. In this manner, a servo loop is established which, in brief, operates as follows: When the target being tracked by the radar system changes in range, the phase position of the video return signals applied to path 20 changes also. If it is assumed that the output pulses from time modulator 10 are originally in phase with the video return signals, the change in phase of the video returns will cause the time demodulator 18 to produce an output direct current which is proportional to the degree of departure of phase coincidence of the two signals in question. The direct current output voltage from demodulator 18 is applied via path 14 to time modulator 10. This causes the time modulator to change the phase of its output pulses in the direction of phase shift of the video return signals so that the two signals again approach coincidence. In this manner, as the target moves in range, the varying output of the time demodulator 18 acts on time modulator 10 to change the phase of its output pulses to coincide with the video return signals. The direct current output from the time modulator is used to charge a range capacitor, and the voltage across this capacitor constitutes the range voltage. This voltage may increase or decrease, depending upon whether or not the range of the target is increasing or decreasing.

When a target is first detected by the radar system, there will be an absence of a direct current error signal on path 14, and the output pulses of time modulator 10 will not be in phase with the video return signals. Consequently, some means must be provided to initially establish coincidence of the output of modulator 10 with the video return signals if the system is to function as a servo loop. For this purpose, acquisition circuit 26, multivibrators A and B, and gated stage 28 are provided. These elements are shown more in detail in Fig. 2.

Figure 2:
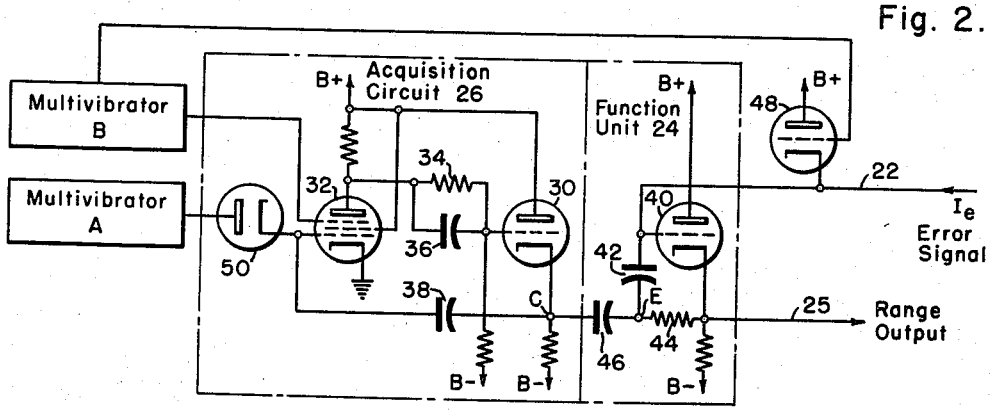
Fig. 2 is a schematic diagram of the acquisition circuit and function unit shown in block form in Fig. 1.

Referring to Fig. 2, acquistion circuit 26 comprises a Miller integrator circuit consisting of a gatable pentode 32 and a cathode follower 30. The anodes of tubes 30 and 32 are both connected to a common source of anode potential, and the anode of pentode 32 is connected to the grid of tube 30 via resistor 34 and capacitor 36. A second capacitor 38 connects the cathode of tube 30 to the control grid of switch tube 32, thereby providing capacitive feedback from the output to the control grid of pentode 32.

Function unit 24 comprises a triode vacuum tube 40 having its grid connected to time demodulator 18 via path 22. The grid of triode 40 is also connected to its cathode through a velocity memory capacitor 42 and resistor 44. As shown, the junction of capacitor 42 and resistor 44 is connected to the cathode of integrator tube 30 by a range memory capacitor 46. The range output voltage is taken from the cathode of triode 40. As was explained in connection with Fig. 1, the range voltage is also applied to time modulator 10 via path 14 as an error signal.

A switch tube 48 has its grid connected to multivibrator B and its cathode connected to path 22. This tube, controlled by multivibrator B, is used to periodically discharge capacitors 42 and 46 prior to the acquisition period and serves to set the initial conditions of the tracking loop.

Figure 3:
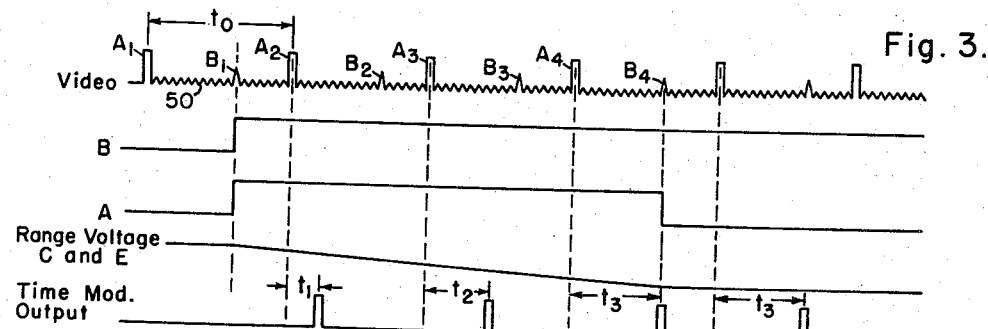
Fig. 3 is a graphical illustration of the operation of the range tracking circuit shown in Fig. 1.

Operation of the acquisition circuit is as follows: When there is an absence of a video return signal for the radar system, multivibrator B will maintain the suppressor grid of pentode 32 below cutoff. Multivibrator A, connected to the control grid of pentode 32 by diode 50, will normally maintain the anode of this diode at a cutoff potential. The anode of diode 50 is connected to a positive supply potential through the circuit of multivibrator A; however, under normal conditions, this positive supply potential is not sufficient to raise the anode of diode 50 above cutoff. The video return signals received by the radar system are shown in Fig. 3 where the transmitted pulse repetition rate of the radar transmitter is indicated by the time elapse $T_0$. As each pulse is transmitted, a certain amount of the RF energy will leak into the receiving portion of the radar antenna and be detected by the receiver of the system. Hence, a series of pulses $A_1$, $A_2$, $A_3$, etc. (called "main bangs"), will appear in the video wave shape. When the radar beam detects a distant object, a series of reflected pulses will apear in the video wave form. These pulses are indicated in Fig. 3 as $B_1$, $B_2$, $B_3$, etc. Also included in the video wave shape of Fig. 3 are small amplitude variations 50 called "noise." These small variations may be caused by any one of a number of factors which excite random electrical fluctuations in the received signal as, for example, thermal agitation. When the video return signals, such as pulses $B_1$, $B_2$, etc., are initially received by the radar system, they trigger multivibrator B to apply a negative cutoff potential to switch tube 48 and, further, to raise the suppressor grid of pentode 32 above cutoff. The output of multivibrator B, as applied to the suppressor grid of the pentode 32, is shown in Fig. 3. The primary detection of a video signal also triggers multivibrator A to enable diode 50 to conduct by raising its anode above cutoff potential. This action of the multivibrators enables the Miller integrator, and the cathode of tube 30 begins a linear rundown in voltage. Thus, with point C (Fig. 2) on one side of capacitor 46 running down in potential, point E on the other side of the capacitor must run down also. Note that since there is essentially no current path from point E to ground, no appreciable charging current flows into the range memory capacitor 46. The cathode of tube 40 must also run down in this process. The output of the system is taken from this cathode and appears as the range voltage shown in Fig. 3.

The linearly decreasing range voltage from acquisition circuit 26 and function unit 24 is applied to time modulator 10. As the range voltage decreases, the time modulator acts to position its output voltage pulses with respect to the transmitted energy pulses from the radar system as a function of the decreasing range voltage. As shown in Fig. 3, the first output voltage pulse from the time modulator, after the acquisition voltage starts its linear rundown, lags the preceding transmitted pulse by time $t_1$. The second pulse lags its preceding transmitted pulse by an increased time interval $t_2$ since the range voltage is now at a lower value and so on. In the present instance, when the time lag equals time $t_3$, the output pulse from the time modulator coincides with the video return pulse $B_4$. This coincidence causes gated stage 28 to trigger multivibrator A to resume the condition it was in before primary detection of a video signal. As a result, multivibrator A applies a negative voltage to the plate of diode 50, at the occurrence of video return $B_4$, thereby cutting off the diode. The Miller integrator circuit now stops its linear rundown and holds constant at the potential of the cathode of tube 40 since there is no path for any current to flow through capacitor 38. The output pulses from time modulator 10 will maintain their phase position ($t_3$) with respect to the transmitted energy pulses until a further error signal is received by the time modulator via path 14. An error signal will be generated by the time demodulator 18 whenever there is an absence of coincidence of the output pulses of time modulator 10 and the video return signals. Thus, as the range of the target changes, the phase position of the video return signals $B_1$, $B_2$, etc., will change also to produce an error signal. This error signal acts on time modulator 10 to shift the phase of its output pulses so that they again coincide with the video return signals. In this manner, as the range of the target and phase position of the video return signals changes, the output pulses from the time modulator follow these changes in always attempting to coincide with the video return signals.

It should be noted that point C is held at a fixed potential instead of ground. In this manner, the current required to charge capacitor 38 to a predetermined voltage level is materially reduced over the case where point C is grounded.

Multivibrators A and B are of the monostable type. That is, they recycle after a predetermined amount of time elapses. In this manner, if coincidence between the output pulses of time modulator 10 and the video return signals should not occur, the multivibrator B will raise the grid of switch tube 48 above cutoff, thereby discharging capacitors 42 and 46. On the next triggering of the multivibrators by a video return signal, points C and E will again start their linear rundown in voltage.

This process is repeated until coincidence between the output of time modulator 10 and the video return signals finally occurs. Usually coincidence will occur during the first or second trial.

Although we have described our invention in connection with a certain specific embodiment, it should be apparent to those skilled in the art that various changes in form and arrangement of parts can be made to suit requirements without departing from the spirit and scope of the invention.

We claim as our invention:

1. In a radar system adapted to receive reflected pulses of transmitted energy from a distant object, an automatic range tracking device including a time demodulator adapted to produce an output direct current voltage which is proportional to the range of said distant object, a time modulator responsive to a direct current control voltage for producing spaced output pulses having a pulse repetition frequency equal to the transmitted pulse recurrence frequency of the radar system and a phase position relative to said transmitted pulses which is a function at any instant of said control voltage, means for applying the output of said time demodulator to said time modulator as a control voltage, and means for applying an initial linearly decreasing direct current voltage to said time modulator until the output pulses from said time modulator coincide in time with received pulses of energy reflected from said distant object, said latter mentioned means comprising a first electron discharge device having an anode and at least two control electrodes included therein, the first of said electrodes being normally biased to cut off current flow through said device, a second electron discharge device having a control electrode and a cathode included therein, means connecting the anode of said first device with the control electrode of said second device, a capacitor connecting the second electrode of said first device with the cathode of said second device, means for biasing the first electrode of said first device above cutoff when a reflected energy pulse is received by said radar system, a unidirectional current device having its cathode connected to said second control electrode of said first device, said unidirectional current device being normally biased below cutoff, means for biasing said unidirectional current device above cutoff upon coincidence of the output pulses from said time modulator with the reflected energy pulses from said distant object, and means connecting the cathode of said second electron discharge device to said time modulator whereby the voltage appearing on the cathode of said second device is used to control operation of said time modulator.

2. In a radar system adapted to receive reflected pulses of transmitted energy from a distant object, an automatic range tracking device including a time demodulator adapted to produce an output direct current voltage which is proportional to the range of said distant object, a time modulator responsive to a direct current control voltage for producing spaced output pulses having a pulse repetition frequency equal to the transmitted pulse recurrence frequency of the radar system and a phase position relative to said transmitted pulses which is a function at any instant of said control voltage, a vacuum tube for applying the direct current output of said time demodulator to said time modulator as a control voltage, a cathode and a control grid for said vacuum tube, means for applying the output of said time demodulator between the grid and cathode of said vacuum tube, a connection between the cathode of said vacuum tube and an input terminal of said time modulator, and means for applying an initial linearly decreasing direct current voltage to said time modulator until the output pulses from said time modulator coincide in time with received pulses of energy reflected from said distant object, said latter mentioned means comprising an electron discharge device having an anode and at least two control electrodes included therein, the first of said electrodes being normally biased to cut off current flow through said device, an electron valve having a control electrode and a cathode, means connecting the anode of said discharge device with the control electrode of said electron valve, a first capacitor connecting the cathode of said electron valve with the second control electrode of said discharge device, a second capacitor connecting the cathode of said electron valve to the cathode of said vacuum tube, means for biasing said first electrode of said discharge device above cutoff when a reflected energy pulse is received by said radar system, a unidirectional current device having its cathode connected to said second control electrode of said discharge device, said unidirectional current device being normally biased below cutoff, and means for biasing said unidirectional current device above cutoff upon coincidence of the output pulses from said time modulator with the reflected energy pulses from said distant object.

3. In combination with a radar system adapted to receive reflected pulses of transmitted energy from a distant object, an automatic range tracking circuit of the type which produces a direct current output voltage proportional to the range of said distant object, and means for supplying a linearly decreasing direct current voltage to said tracking circuit to initiate its tracking function when reflected energy pulses are first received by said radar system, said latter mentioned means including first and second electron valves, each having input and output terminals adapted for connection to the negative and positive terminals, respectively, of a direct current voltage source, an electrically responsive control element for each of said valves, means connecting the output terminal of the first of said valves to the control element of the second of said valves, a capacitor connecting the input terminal of said second valve to the control element of said first valve, a unidirectional current device having its cathode connected to the control element of said first valve, said unidirectional current device being normally biased below cutoff, and means for selectively biasing said unidirectional current device above cutoff.

4. In combination with a radar system adapted to receive reflected pulses of transmitted energy from a distant object and having an automatic range tracking circuit of the type which produces a direct current output voltage proportional to the range of said distant object, means for supplying a linearly decreasing direct current voltage to said tracking circuit to initiate its tracking function when reflected energy pulses are first received by said radar system from said object, said means including an electron path having an impedance element and a capacitor included therein, means for initiating charging of said capacitor when a reflected energy pulse from said object is first received by the radar system, and means for applying at least a portion of the voltage appearing across said impedance element to the range tracking circuit as said linearly decreasing voltage.

5. The combination claimed in claim 4 and including means for stopping the charging action of said capacitor when the range tracking function of said range tracking circuit is initiated.

6. A device for generating a direct current voltage which varies substantially linearly with respect to time and comprising first and second electron valves, an electron emitter electrode and an electron collector electrode for each of said valves, a source of supply potential for said electron valves having its positive terminal connected to said collector electrodes, an electrically responsive control element included in each of said valves for varying electron flow therethrough, means connecting the collector electrode of said first valve to the control element of said second valve, a capacitor connecting the emitter electrode of said second valve to the control element of said first valve, means for selectively varying electron flow through said first valve, a unidirectional current device having its cathode connected to the control element of said first valve, said unidirectional current device being normally biased below cutoff, means for selectively biasing said unidirectional current device above cutoff, a capacitor and a first impedance element in series connecting the emitter electrode of said second valve to the negative terminal of said source of supply potential, and a second impedance element connected in shunt with the series combination of said capacitor and first impedance element.

7. A device for generating a direct current voltage which varies substantially linearly with respect to time and comprising first and second electron valves, an electron emitter electrode and an electron collector electrode for each of said valves, a source of supply potential for said electron valves having its positive terminal connected to said collector electrodes, an electrically responsive control element included in each of said valves for varying current flow therethrough, means connecting the collector electrode of said first valve to the control element of said second valve, means connecting the emitter electrode of said second valve to the control element of said first valve, a capacitor and a first impedance element in series connecting the emitter electrode of said second valve to the negative terminal of said source of supply potential, and a second impedance element connected in shunt with the series combination of said capacitor and first impedance element.

References Cited in the file of this patent

UNITED STATES PATENTS

| | | |
|---|---|---|
| 2,516,356 | Tull et al. | July 25, 1950 |
| 2,628,349 | Nightenhelser | Feb. 10, 1953 |
| 2,642,532 | Mofenson | June 16, 1953 |
| 2,675,469 | Harker et al. | Apr. 13, 1954 |